US012562569B2

(12) United States Patent   (10) Patent No.:  US 12,562,569 B2
Gubba Ravikumar et al.   (45) Date of Patent:   Feb. 24, 2026

(54) CONTROLLING ENERGY USAGE WITHIN DATA CENTERS

(71) Applicant: Google LLC, Mountain View, CA (US)

(72) Inventors: Krishnanjan Gubba Ravikumar, Ashburn, VA (US); Hariharan Subramanian, Everett, WA (US)

(73) Assignee: Google LLC, Mountain View, CA (US)

( * ) Notice: Subject to any disclaimer, the term of this patent is extended or adjusted under 35 U.S.C. 154(b) by 8 days.

(21) Appl. No.: 18/430,038

(22) Filed: Feb. 1, 2024

(65) Prior Publication Data

US 2025/0253651 A1    Aug. 7, 2025

(51) Int. Cl.
H02J 1/08      (2026.01)
G06F 9/455    (2018.01)
H02J 3/14      (2026.01)

(52) U.S. Cl.
CPC ........... H02J 1/08 (2013.01); G06F 9/45558 (2013.01); H02J 3/14 (2013.01); G06F 2009/4557 (2013.01)

(58) Field of Classification Search
CPC ........... H02J 1/08; H02J 3/14; G06F 9/45558; G06F 2009/4557
See application file for complete search history.

(56) References Cited

U.S. PATENT DOCUMENTS 8,862,914 B2 * 10/2014 Kansal ................ G06F 11/3447
                                                        713/320
8,914,157 B2 * 12/2014 Li ........................ G06F 1/3203
                                                        713/300

| | | | |
|---|---|---|---|
| 8,996,890 B2 * | 3/2015 | Cox ...................... | G06F 9/5088 |
| | | | 713/300 |
| 9,960,637 B2 | 5/2018 | Sanders et al. | |
| 10,128,684 B2 | 11/2018 | Ramamurthy et al. | |
| 11,126,242 B2 | 9/2021 | Shaikh et al. | |
| 11,669,144 B2 | 6/2023 | McNamara et al. | |
| 11,670,959 B2 | 6/2023 | Kamel et al. | |
| 2009/0187775 A1 * | 7/2009 | Ishikawa ............... | G06F 1/3203 |
| | | | 713/310 |

(Continued)

FOREIGN PATENT DOCUMENTS

CN          116683644 A       9/2023

OTHER PUBLICATIONS

Extended European Search Report for European Patent Application No. 25155079.4 dated Jun. 20, 2025. 11 pages.

*Primary Examiner* — Jaweed A Abbaszadeh
(74) *Attorney, Agent, or Firm* — Lerner David LLP

(57)           ABSTRACT

Aspects of the disclosed technology include techniques and mechanisms for controlling energy usage within data centers. An energy control system (ECS) may use measurement sensors that are integrated within different energy sources and different sources of energy consumption to gather energy usage information. The ECS may analyze the energy usage information using control algorithms. The control algorithms may analyze a current operational state of the data center and identify control modes containing control actions for enhancing and managing the performance of the data center. The ECS may elect an identified control mode and may transmit, via the measurement sensors, instructions for the energy sources and the sources of energy consumption to execute the control actions outlined within the elected control mode.

19 Claims, 7 Drawing Sheets

(56) References Cited

U.S. PATENT DOCUMENTS

| | | | | |
|---|---|---|---|---|
| 2017/0322241 A1* | 11/2017 | Tang | ...................... | G06N 20/00 |
| 2020/0133707 A1* | 4/2020 | Coster | ..................... | G06F 1/329 |
| 2023/0387689 A1 | 11/2023 | Ng et al. | | |
| 2024/0118738 A1 | 4/2024 | Patel et al. | | |

* cited by examiner

400

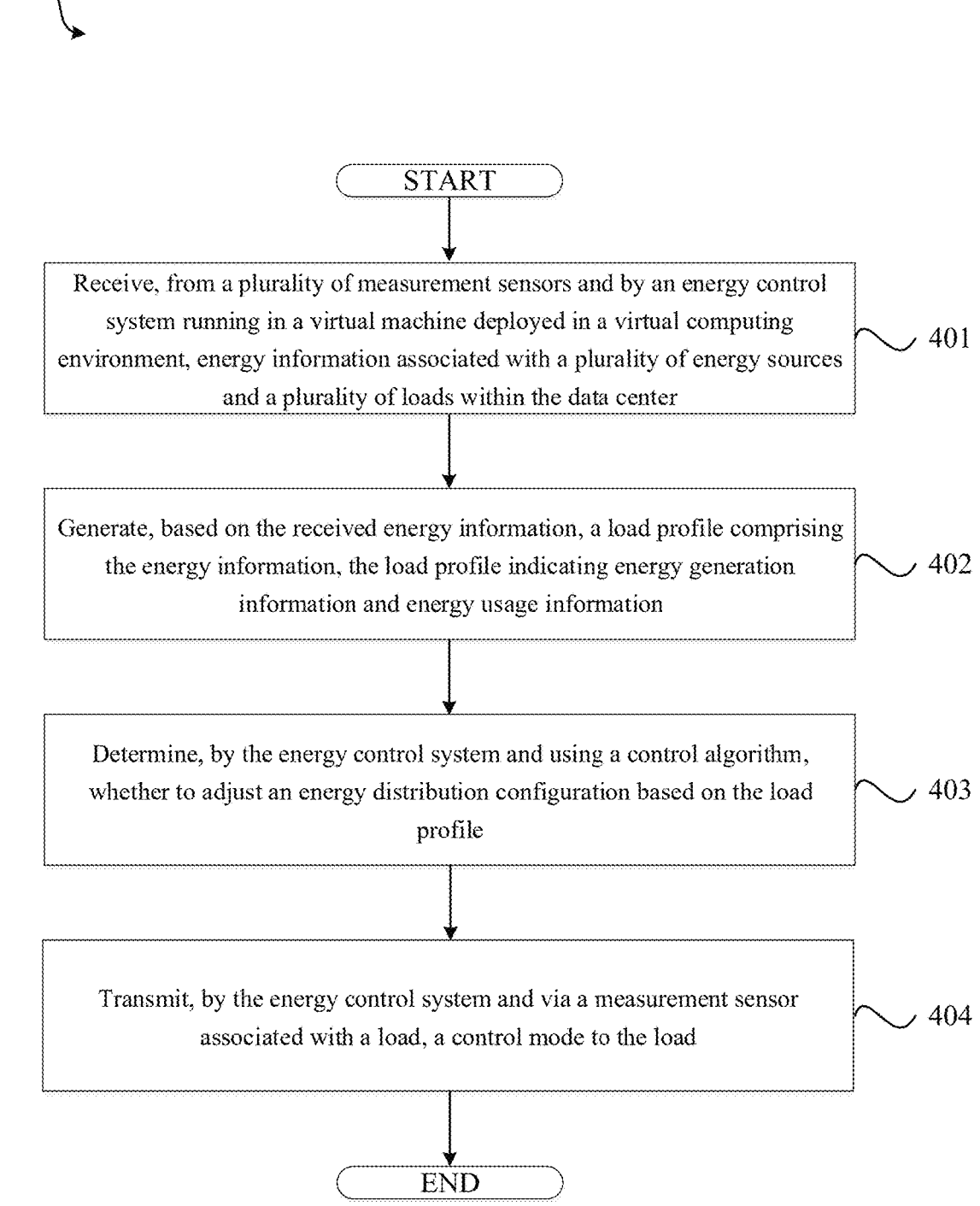

START

Receive, from a plurality of measurement sensors and by an energy control system running in a virtual machine deployed in a virtual computing environment, energy information associated with a plurality of energy sources and a plurality of loads within the data center — 401

Generate, based on the received energy information, a load profile comprising the energy information, the load profile indicating energy generation information and energy usage information — 402

Determine, by the energy control system and using a control algorithm, whether to adjust an energy distribution configuration based on the load profile — 403

Transmit, by the energy control system and via a measurement sensor associated with a load, a control mode to the load — 404

END

FIG. 4

CONTROLLING ENERGY USAGE WITHIN DATA CENTERS

BACKGROUND

A data center typically includes energy sources, energy consumers (referred to herein as loads), and one or more off-the-shelf control systems. In many data centers, such control systems may be developed by different vendors resulting in custom logic and custom hardware. As such, integrating and using such a control system typically requires training on custom hardware and logic, and keeping up to date with such hardware and logic. As the number of vendors increase, the number and different types of hardware and logic increases. In addition, such hardware and logic often requires customization to adapt them to a particular facility, e.g., a particular data center. It can also delay onsite testing and maintenance of the data center since vendor input may be needed to retrieve certain information collected by the control system. Further, each vendor may have preferred control systems for different energy sources and loads. This may result in a data center having multiple control systems provided by different vendors for some of the same components.

In some instances, the control system(s) may manage energy usage within the data center by adding, removing/shedding loads. However, such control system(s) are oftentimes not configured to control energy at more granular levels, e.g., based on workflow, processing parameters or based on the configuration of the network within a data center.

SUMMARY

Aspects of the disclosed technology include methods, apparatuses, systems, and computer-readable media for controlling energy usage within data centers. For example, a data center may use an energy control system (ECS) to track energy usage levels within the data center and to more efficiently manage usage levels. The ECS may use measurement sensors to read energy information from different energy sources and different loads (collectively referred to herein as data center components) and read information from mechanical systems. The ECS thus monitors each energy source within the data center as well as each energy consumer (e.g., load) within the data center and controls the energy usage by adjusting the sources and/or distribution of energy within the datacenter. The ECS uses a standardized interface that is compatible with each of the energy sources to gather energy data from each energy source.

The energy information can include energy generation information from the different energy sources and energy usage information from the different loads, such as IT loads, cooling loads, networking loads, balance of plant loads). Each measurement sensor may have the same set of input and output ports. Each input port is configured to receive energy information and system state information of a particular asset, such as a particular energy source. Each output port is configured to transmit the energy information and the asset state information to the ECS. The asset state information indicates whether a particular energy source is powered ON/OFF, a current state of charge of the energy source, whether the particular energy source is charging, or the like. In some instances, the asset state information indicates an amount of energy that each load uses. The energy information and asset state information that is transmitted to the ECS is combined to create a load profile, which describes a current operational status of the data center as a whole. The measurement sensors are configured to read and transmit the energy information and the asset state information without requiring vendor specific hardware or logic.

The ECS provides a standardized interface that is compatible with each of the data center components. The ECS uses a virtualized computing environment to analyze the energy information and the asset state information received from the measurement sensors. The virtualized computing environment may be hosted via a distributed computing environment, such as a cloud network, a cloud-based server, or the like. The virtualized computing environment further reduces the need for vendor specific hardware or logic to track energy. Within the virtualized computing environment, the ECS uses the analysis of the load profile to, for example, redistribute the energy generated by the different energy sources or redistribute the loads based on the energy information and external factors that may impact the energy information. For example, one factor that the ECS may consider when redistributing loads is the cost efficiency of pulling energy from the grid during peak hours when alternative energy sources, such as batteries that charge up during off peak hours, are available for use.

The ECS uses one or more control algorithms to analyze the energy information received from the measurement sensors. The control algorithms are used to analyze the current operational state of the data center and identify possible control modes for modifying the energy usage levels within the data center. A control mode indicates modifications to an energy distribution configuration within the data center. In particular, a control mode indicates an automatic reconfiguration of the energy distribution in the current operational status of the data center. For example, a control mode may change the energy sources that are used to generate energy for the data center, the energy sources that are used to power loads, the loads that pull energy from specific energy sources, or the like. To modify the energy distribution configuration, the ECS selects energy sources that should continue supplying energy at full capacity to the power infrastructure and energy sources that should stop supplying energy or reduce the amount of energy that is supplied to the power infrastructure. The ECS also instructs and dispatches the energy sources that should continue supplying energy to the power infrastructure to power the loads by increasing or decreasing its energy output.

Each control mode contains control actions for improving the performance of the data center. Control actions may indicate one or more steps to be executed to shift the data center energy configuration from its current operational status to the operational status outlined in the elected control mode. A control action can include traditional energy control operations, such as increasing or decreasing a particular energy source's power output. A control action can include traditional energy control operations, such as any one of the following increasing, decreasing, re-routing, or shedding loads within the data center based on the data center performance analysis. A control action can include, for example, communicating with data center components at more granular levels to use management controls or cluster management services to load-shift or load balance by instructing servers and processors to reduce or stop certain workloads and redirect work from one group of servers to another group of servers which has capacity available.

As an example of one operation, the ECS receives, from the measurement sensors, energy information from each energy source and each load. The received information is used to generate the load profile that describes the current operational state of the data center. The ECS uses at least one control algorithm to analyze the load profile. Based on the analysis, the ECS elects a control mode and transmits, via the measurement sensors, instructions for the data center components to execute the control actions outlined within the elected control mode.

One aspect of the disclosure provides for a system comprising: a first plurality of measurement sensors coupled to a plurality of energy sources; a second plurality of measurement sensors coupled to a plurality of loads; a power infrastructure configured to receive energy from the plurality of energy sources and distribute energy to the plurality of loads; an energy control system deployed in one or more instances running in a virtual computing environment of a data center, the energy control system coupled to the first plurality of measurement sensors and the second plurality of measurement sensors and configured to: derive, from data received from the first plurality of measurement sensors and the second plurality of measurement sensors, a load profile comprising energy information associated with the plurality of energy sources and the plurality of loads within the data center; determine, using a control algorithm, whether to adjust an energy distribution configuration based on the load profile; and transmit, via a measurement sensor of the second plurality of measurement sensors that is associated with a load, a control mode to the load.

In the foregoing instance, the energy information identifies particular energy sources that are configured to distribute energy to particular loads via the power infrastructure.

In any one of the foregoing instances, the control mode comprises modifications to the energy distribution configuration.

In any one of the foregoing instances, modifying the energy distribution configuration causes the energy control system to: select energy sources of the plurality of energy sources to continue supplying energy to the power infrastructure; and select energy sources of the plurality of energy sources to stop supplying energy to the power infrastructure.

In any one of the foregoing instances, the load receives energy from the energy sources of the plurality of energy sources that continue to supply energy to the power infrastructure.

In any one of the foregoing instances, adjusting the energy distribution configuration causes the energy control system to: instruct the load to reduce an amount of voltage that is pulled from the power infrastructure; or instruct the load to increase the amount of voltage that is pulled from the power infrastructure.

In any one of the foregoing instances, the one or more instances running in the virtual computing environment are hosted by one or more virtual machines controlled by a hypervisor.

In any one of the foregoing instances, the first plurality of measurement sensors are integrated within the plurality of energy sources; and the second plurality of measurement sensors are integrated within the plurality of loads and electrical equipment within the data center.

In any one of the foregoing instances, determining, using the control algorithm, whether to adjust the energy distribution configuration further causes the energy control system to: track a topology of the data center; and track a topology of the plurality of energy sources within the data center.

In any one of the foregoing instances, determining, using the control algorithm, whether to adjust the energy distribution configuration further causes the energy control system to dispatch the energy source based on load needs of the data center.

In any one of the foregoing instances, determining, using the control algorithm, whether to adjust the energy distribution configuration further causes the energy control system to: perform fast load shedding based on the dispatch of the energy source; balance remaining energy sources of the plurality of energy sources; and balance an amount of energy that is distributed to remaining loads of the plurality of loads.

In any one of the foregoing instances, determining, using the control algorithm, whether to adjust the energy distribution configuration further causes the energy control system to: monitor an amount of energy generated by the energy source during a current operation of the data center; monitor changes in the amount of energy generated based on comparing the amount of energy generated during the current operation of the data center to an amount of energy generated in historic operations of the data center; and modify an amount of energy generated by the energy source based on the monitored changes.

In any one of the foregoing instances, the control mode comprises control actions for maintaining stable performance of the data center.

Another aspect of the disclosure provides for a method for managing energy usage in a data center, the method comprising: receiving, from a plurality of measurement sensors and by an energy control system running in a virtual machine deployed in a virtual computing environment, energy information associated with a plurality of energy sources and a plurality of loads within the data center; generating, based on the received energy information, a load profile comprising the energy information, the load profile indicating energy generation information and energy usage information; determining, by the energy control system and using a control algorithm, whether to adjust an energy distribution configuration based on the load profile; and transmitting, by the energy control system and via a measurement sensor associated with a load, a control mode to the load.

In the foregoing instance, the virtual computing environment comprises one or more virtual machines instances controlled by a hypervisor.

In any one of the foregoing instances, adjusting the energy distribution configuration comprises: instructing, by the energy control system and via the measurement sensor associated with the load, the load to reduce an amount of voltage that is pulled from a power infrastructure; or instructing, by the energy control system and via the measurement sensor associated with the load, the load to increase the amount of voltage that is pulled from the power infrastructure.

In any one of the foregoing instances, the control mode comprises energy control actions for adjusting the energy distribution configuration to maintain stable performance of the data center.

In any one of the foregoing instances, the plurality of measurement sensors comprises: a first plurality of measurement sensors integrated within the plurality of energy sources; and a second plurality of measurement sensors integrated within the plurality of loads.

In any one of the foregoing instances, the energy information identifies particular energy sources that are configured to distribute energy to particular loads via a power infrastructure within the data center.

In any one of the foregoing instances, the control mode comprises modifications to the energy distribution configuration.

In any one of the foregoing instances, the method further comprises modifying, by the energy control system, the energy distribution configuration, the modifying comprising: selecting, by the energy control system, energy sources of the plurality of energy sources to continue supplying energy to a power infrastructure; and selecting energy sources of the plurality of energy sources to stop supplying energy to a power infrastructure.

In any one of the foregoing instances, the method further comprises transmitting, by the energy control system and via a measurement sensor associated with an energy source, the control mode to the energy source.

Another aspect of the disclosure provides for a non-transitory computer readable storage medium storing instructions that, when executed by one or more processors for managing energy usage in a data center using an energy control system deployed in one or more instances running in a virtual computing environment of the data center, cause the one or more processors to: derive, from data received from a first plurality of measurement sensors and a second plurality of measurement sensors, a load profile comprising energy information associated with a plurality of energy sources and a plurality of loads within the data center; determine, using a control algorithm, whether to adjust an energy distribution configuration based on the load profile; and transmit, via a measurement sensor of the second plurality of measurement sensors that is associated with a load, a control mode to the load.

BRIEF DESCRIPTION OF THE DRAWINGS

FIG. 4 illustrates a flow diagram for an example method for controlling energy usage within data centers, in accordance with aspects of the disclosure.

DETAILED DESCRIPTION

Overview

Figure 1:
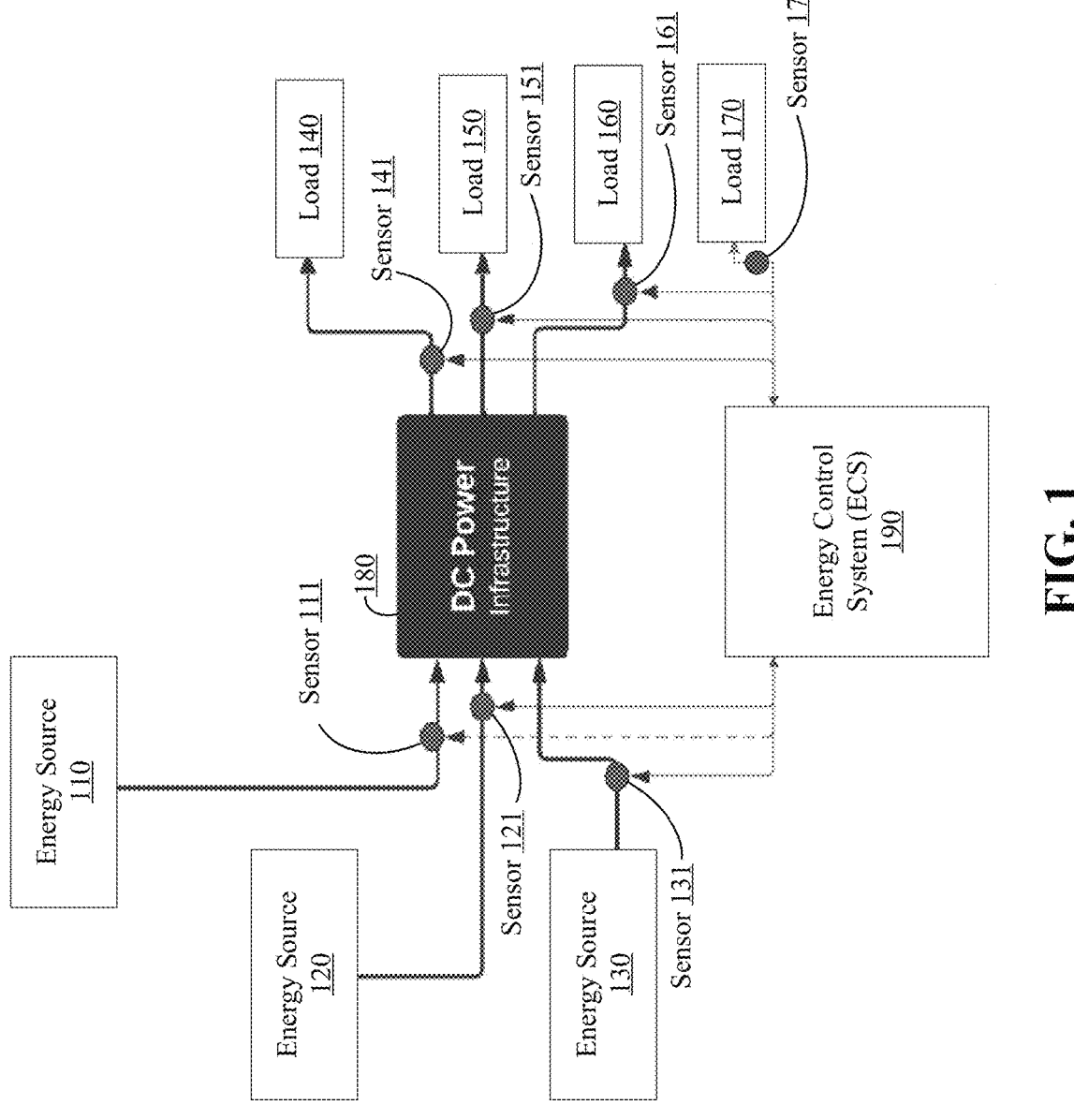
FIG. 1 illustrates an example energy infrastructure environment for controlling energy usage within data centers, in accordance with aspects of the disclosure.

The disclosed technology is directed to an energy control system (ECS) for monitoring and controlling electrical energy usage in a data center. The ECS includes elements integrated within different data center components to manage energy levels within the data center. The ECS monitors each energy source within the data center as well as each energy consumer within the data center. The ECS uses a standardized interface that is compatible with each of the energy sources to gather energy data from each energy source. For example, energy sources within the data center may include a utility power grid, diesel generators, inverter based resources (IBRs) such as solar powered units, battery energy storage systems (BESS), fuel cells, or the like. Sources of energy consumption or energy consumers within the data center may include, for example, information technology (IT) loads, cooling systems, networking infrastructure, necessary data center utilities such as lighting, signage, or the like.

The ECS uses measurement sensors that are integrated within energy sources, energy loads, and other electrical equipment that may be used in the data center. For example, the measurement sensors may be integrated within generators, switchgears, transformers, protection relays or other data center components. The data center components may be powered by traditional energy sources (e.g., utility, diesel generators, or the like) or alternative energy sources (e.g., BESS, PV, fuel cells, or the like). The ECS may monitor and control the energy sources and loads within the data center to manage the use of energy therein. The data that is collected by the measurement sensors may be fed into the ECS as input. The totality of such data provides an energy load profile of the data center. In some instances, each energy source associated with an energy load may generate an independent energy load profile.

The ECS runs a suite of virtualized control algorithms. The control algorithms may be configured to, for example: (1) track a topology of the energy sources and energy loads within the data center; (2) dispatch and control energy that is transmitted to the energy sources, control modes of operation of the energy sources based on loads needs of the data center, and control energy levels for more efficient data center performance and operation; (3) perform fast load shedding based on sudden loss of energy, balancing energy sources, and balancing energy loads; (4) perform under-frequency based hybrid load shedding; (5) perform economic dispatch of IBRs, and participate in grid services and demand response programs based on availability. More or fewer control algorithms may be executed by the ECS.

The control algorithms may also be configured to adaptively choose between different energy operations. An energy operation may include energy control modes and/or different energy control actions for more efficiently managing overall system performance and operation. In some instances, one or more control algorithms may include cost efficient energy control modes and energy control actions based on, at least, a grid power cost and available distributed energy resources (DERs) within the data center campus that may participate in demand response scenarios and other grid services to derive maximum benefit from the energy sources within the data center. Hosting the at least one virtualized control algorithm via the cloud network and/or the cloud-based server allows for ensuring that the ECS is not tied to specific hardware architecture.

An energy operation includes, for example, identifying where energy may be needed in the data center topology and routing energy accordingly. An energy operation may in some instances adjust energy usage by, for example, identifying where energy may be decreased in the data center topology and initiating load shedding accordingly. Load shedding may include shedding circuit breakers feeding specific loads or software level load shedding using load optimizers and cluster management services. In some instances, choosing an energy operation may be based on an analysis of the input data gathered by the measurement sensors. In some instances, energy operations are implemented in the data center topology based on predisposed knowledge of how particular loads will behave at particular times. For example, the ECS may receive, from a data center administrator, instructions to execute pre-defined control strategies for managing power distribution and usage at particular times.

The ECS may elect one or more energy operations to be executed within the data center. The ECS may identify the data center components that are relevant to the one or more elected energy modification operations and may transmit the one or more elected energy modification operations to the identified data center components via the measurement sensors.

The control algorithms make use of defined interfaces and application programming interfaces (APIs) to interact with data center cluster management systems and load managers for load shedding and/or load reduction. In some instances, the ECS may use defined interfaces for interacting with entities outside of the data center campus. For example, the ECS may use defined interfaces for interacting with utility providers for grid services, demand response programs, economic dispatch, or other services offered by the utility providers and that are used within the data center campus.

In some instances, the defined interface refers to standardized input and output interfaces of the one or more measurement sensors. Each measurement sensor has the same set of input and output ports, which are used to transmit energy information and asset state information to the ECS and receive instructions from the ECS. The asset state information may indicate whether a particular energy source is powered ON/OFF and a current state of charge of the energy source. Measurement sensors use the input ports to gather energy generation information and an asset state from different energy sources and gather energy usage information and the asset state from the different loads. Measurement sensors use the output ports to transmit the gathered energy generation information, energy usage information, and asset state information to the ECS. Therefore, the input and output ports of the measurement sensors allow the ECS to communicate with all of the data center components.

The foregoing aspects of this technology offer an ECS integrated within a data center and configured to modify energy usage and energy loads within the data center based on running one or more virtualized control algorithms. The ECS and the control algorithms might not require custom and/or component-specific hardware. The ECS and the control algorithms may run on the cloud network and/or the cloud-based server within the data center campus. The ECS may maintain a level of reliability, dependability, and latency that is needed for control applications. The ECS may provide for improved redundancy compared to traditional data center energy modification solutions.

EXAMPLE SYSTEMS

FIG. 1 illustrates an example of an energy infrastructure environment for controlling energy usage within data centers. Energy environment 100 depicts a data center architecture that includes a plurality of energy sources and a plurality of loads. For example, energy environment 100 depicts a data center that includes energy sources 110-130 and loads 140-170. As shown, each of energy sources 110-130 feeds into a data center (DC) power infrastructure 180. The totality of the energy received from energy sources 110-130 will typically be distributed among the loads running within environment 100. For example, DC power infrastructure 180 may distribute the received energy across loads 140-170. While energy sources 110-130 and loads 140-170 are depicted in environment 100, a data center may include more or fewer than three energy sources and three loads. Energy sources 110-130 and loads 140-170 are depicted in environment 100 solely for illustrative purposes, not limitation.

Each of energy sources 110-130 corresponds to a different energy source. In some examples, energy source 110 corresponds to energy received from a utility grid. In some examples, energy source 120 corresponds to energy received via alternative energy sources, such as inverter based resources (IBRs), distributed energy sources (DERs), or the like. IBRs and DERs can include, for example, photovoltaic (PV) energy sources, battery energy storage systems (BESS), or fuel cells (FC). In some examples, energy source 130 corresponds to energy generated via diesel generators.

DC power infrastructure 180 receives energy from energy sources 110-130, converts (e.g., AC to DC) it and distributes it to the loads. DC power infrastructure 180 may be a power-efficient distribution architecture that is configured to distribute a totality of energy within computing environment 100.

DC power infrastructure 180 supplies energy to one or more loads operating within the data center, such as loads 140-170. Loads 140-170 may correspond to different functions and/or operations within the data center. In some examples, load 140 corresponds to a balance of plant (BOP) load that supports processes and components for delivering energy to loads after the energy is generated. In some examples, load 150 corresponds to powering cooling systems within the data center. In some examples, load 160 corresponds to supporting networking infrastructure that is needed to maintain the functionality of the data center. In some examples, load 170 corresponds to IT/server loads which form the bulk of the data center load. In some instances, loads 140-170 may correspond to external functions that are needed to maintain the data center structure, such as lighting or signage.

As illustrated in FIG. 1, each of energy sources 110-130 and loads 140-170 have a respective sensor, such as sensors 111-171. Each of sensors 111-171 is a measurement sensor configured to read energy information from a respective data center component. Typically, sensors 111-171 have the same set of input and output ports. Each input port is configured to receive energy information and asset state information. Each output port is configured to transmit the energy information and asset state information to the energy control system (ECS) 190. A first plurality of sensors may include sensors 111-113. Each sensor within the first plurality of sensors detects energy transmissions from energy sources 110-130 to DC power infrastructure 180. Based on detecting energy transmissions, sensors 111-131 measure an amount of energy that is supplied to DC power infrastructure 180. A second plurality of sensors may include sensors 141-171. Each sensor within the second plurality of sensors detects energy transmissions from DC power infrastructure 180 to loads 140-170. In effect, sensors 141-171 measure an amount of energy that is supplied to each of the loads 140-170. The measurement information may include the amount of energy that is supplied to DC power infrastructure 180, the amount of energy that is supplied to loads 140-170, or energy data related to functions that are needed to maintain the data center.

In some instances, energy might not be supplied from each of energy sources 110-130 to DC power infrastructure 180. As such, sensors 111-131 continuously monitor energy sources 110-130 for active energy transmissions and monitor the active energy transmissions. Further, in some instances, energy might not be supplied from DC power infrastructure 180 to each of loads 14-170. As such, sensors 141-171 continuously monitor DC power infrastructure 180 for active energy transmissions and monitor the active energy transmissions.

In addition to collecting energy information from the data center components, sensors 111-171 may also record information that describes the corresponding data center component, such as the asset information described above. For example, the sensors can detect a status of each energy source as well as an energy source from which a load receives power. Sensors 111-171 transmit the information that describes the data center components to ECS 190. The information that describes the data center components may be used by one or more control algorithms to identify methods of reducing the cost performance of the data center by modifying active energy sources, adjusting the specific energy sources that power specific loads, or the like.

Sensors 111-171 are coupled to ECS 190. As such, sensors 111-171 route, via the output ports therein, energy information to ECS 190. Sensors 111-171 receive, via the input ports therein and from ECS 190, at least one control mode to be implemented throughout energy environment 100. A control mode identifies and describes an automatic reconfiguration of energy distribution in a current operational status of the data center. A control mode may outline control actions to be executed within energy environment 100 to modify the energy usage therein. Control actions indicate one or more steps to be executed to shift the data center energy configuration from its current operational status to the operational status provided via the elected control mode. Sensors 111-171 use their output ports to transmit instructions to implement the control mode to the respective data center component. For example, when transmitting the instructions to energy sources 110-130, sensors 111-131 are configured to transmit the instructions to processors within energy sources 110-130 that control the energy source's energy generation process. For example, when transmitting the instructions to loads 140-170, sensors 141-171 are configured to transmit the instructions to processors within loads 140-170 that control requests for energy from energy sources 110-130. Sensors 111-171 and the corresponding data center components may adjust the flow of energy within energy environment 100. ECS 190 is described in further detail in connection with FIG. 2.

Figure 2:
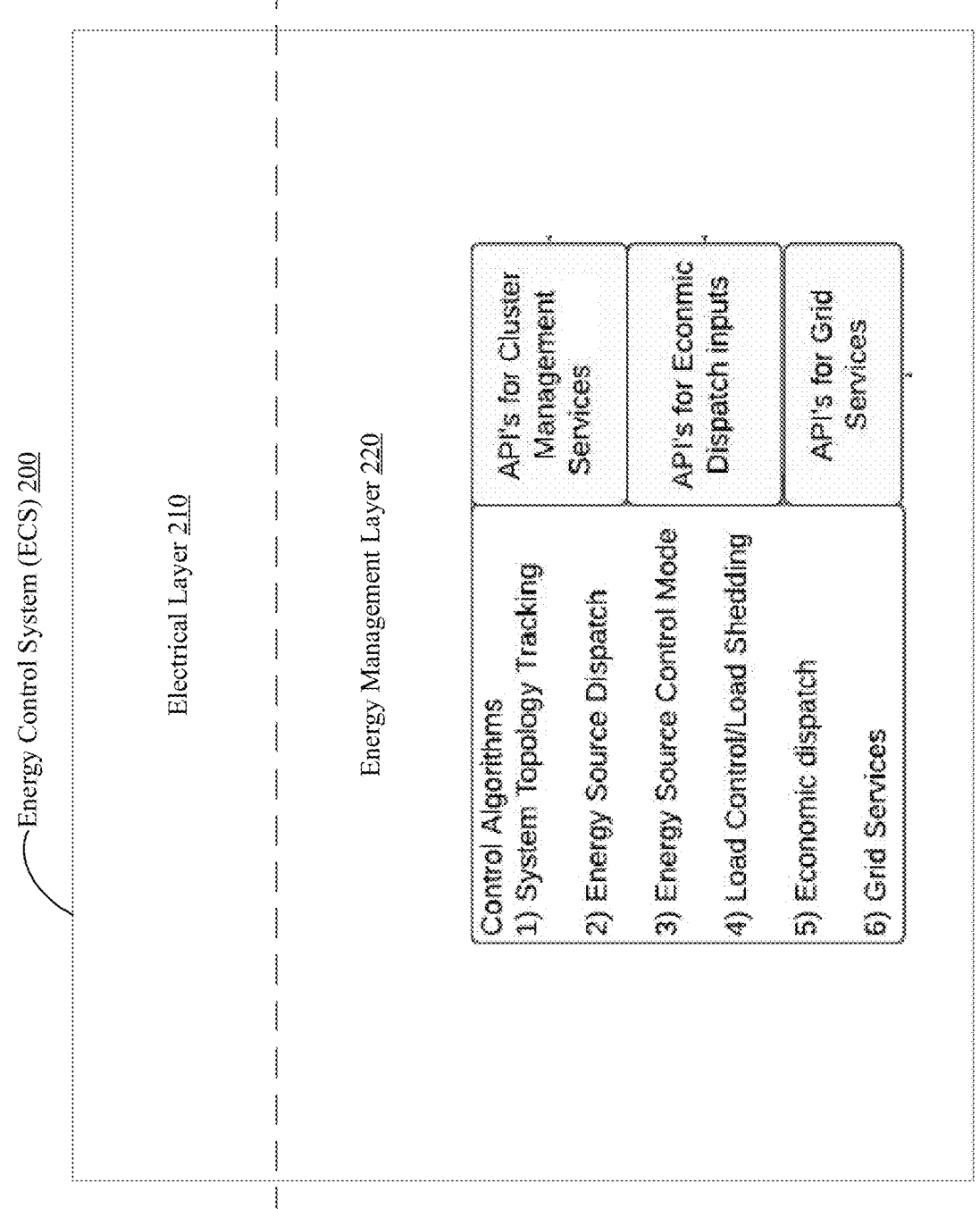
FIG. 2 illustrates an example energy control system for controlling energy usage within data centers, in accordance with aspects of the disclosure.

FIG. 2 illustrates an example energy control system (ECS) for controlling energy usage within data centers. ECS 200 provides a standardized interface that is used to gather energy information from different data center components. ECS 200 uses a virtualized computing environment of the data center to perform the energy analyses discussed herein. The virtualized computing environment allows the energy control analysis to be decoupled from proprietary hardware that may previously have been required to achieve the same. ECS 200 may be deployed in one or more instances that run within virtual machines or containers under the control of a hypervisor or operating system running commercial servers. ECS 200 is a plug-and-play system that may be added to different types of facilities to measure an amount of energy transmitted between components. ECS 200 is dynamically configured such that additional data center components and corresponding sensors may be added to or removed from the ECS without interrupting operation of the ECS.

As illustrated in FIG. 2, ECS 200 may include two layers, such as electrical layer 210 and energy management layer 220. Electrical layer 210 receives the energy information and the asset state information from sensors 111-171. The received energy information and the asset state information may be compiled to generate a load profile of the data center.

The load profile describes the amount of energy fed into DC power infrastructure 180, the state of those energy sources, the amount of energy that is pulled from DC power infrastructure 180 by each load and their state, and other energy information pertinent to functions that maintain the data center structure. ECS 200 may use the energy usage data from sensors 111-171 to modify the load profile. In particular, ECS 200 uses energy management layer 220 to analyze the load profile using a suite of control algorithms. In some instances, the suite of control algorithms may be defined by vendors. Additionally or alternatively, the suite of control algorithms may be defined using industry-wide practices. Each control algorithm tracks the flow of energy through energy environment 100 and uses the flow of energy to more efficiently manage the performance of the data center.

In some instances, determining whether to adjust the performance of the data center depends on comparing the current operational status of the data center to historic operational statuses of the data center. The current operational status is described using the load profile. The historic operational statuses may be described using previously generated load profiles, which describe snapshots of data center operations at particular times. For example, previously generated load profiles may describe times during which the loads within the data center experienced an increased energy demand, reduced energy demands, load shedding, or the like.

While FIG. 2 illustrates an enumerated list of control algorithms that may be executed in energy management layer 220, more or fewer than six control algorithms may be executed. Six control algorithms are illustrated for illustrative purposes only, not limitation. Energy management layer 220 is configured to execute any one of the control algorithms. As described in further detail below, each control algorithm analyzes an amount of energy produced by energy sources 110-130 and an amount of energy used during the operation of loads 140-170. The amount of energy produced by energy sources 110-130 can be adjusted relative to the amount of energy used during the operation of loads 140-170. Similarly, the amount of energy used during the operation of loads 140-170 can be adjusted relative to the amount of energy produced by energy sources 110-130.

As illustrated in FIG. 2, energy management layer 220 is operable to execute one or more control algorithms. For example, energy management layer 220 uses a system topology algorithm to track/monitor a topology of the data center and its energy sources. For example, energy management layer 220 tracks/monitors a topology of energy environment 100 and energy sources 110-130. In some instances, the system topology tracking control algorithm includes tracking/monitoring a topology of loads operating within the data center, such as loads 140-170. In some instances, tracking/monitoring the topology of the data center includes monitoring external functions that are needed to maintain the data center structure, such as lighting and signage. The topology of energy environment 100 and the components therein are used to determine whether to adjust the performance of the data center based on observing regional changes in energy usage over time.

Energy management layer 220 may further execute an energy source dispatch control algorithm. Energy management layer 220 determines whether to reduce an amount of energy that is transmitted from an energy source to a data center energy storage location. For example, energy management layer 220 determines whether to reduce an amount of energy transmitted from one or more of energy sources 110-130 to DC power infrastructure 180. Reducing the amount of energy transmitted from one or more energy sources may depend on energy needs of the loads operating within the data center, such as loads 140-170.

Energy management layer 220 may also execute an energy source control mode control algorithm. Energy management layer 220 monitors the functionality of a specific energy source. For example, energy management layer 220 continuously monitors the energy production of at least one of energy sources 110-130 during a current operation of the data center. Energy management layer 220 tracks changes in the energy production of at least one of energy sources 110-130 based on comparing the amount of energy produced during the current operation to an amount of energy produced in previous operations of the data center. Based on detecting a change in the energy production, energy management layer 220 adjusts the amount of energy that is transmitted from at least one of energy sources 110-130 to DC power infrastructure 180.

Energy management layer 220 may execute a load control and/or load shedding control algorithm. Energy management layer 220 identifies one or more loads that experience reduced energy usage at specific times and preemptively reduces an amount of energy transmitted to the one or more loads. In some instances, energy management layer 220 identifies one or more loads that are at risk of experiencing power outages and preemptively initiates load shedding to safeguard the one or more loads. Based on initiating load shedding or reducing an amount of energy that is transmitted to the one or more loads, energy management layer 220 balances the amount of energy remaining in the data center. Further, energy management layer 220 balances the amount of energy that is distributed to the remaining loads operating within the data center.

Energy management layer 220 may execute an economic dispatch control algorithm. Energy management layer 220 determines one or more cost-efficient implementations of load shedding and load control. In some instances, cost-efficient load control and load shedding causes energy management layer 220 to determine whether reducing or cutting one or more loads increases the overall performance of the data center while reducing the cost of performance. Cost-efficient load control and load shedding further causes energy management layer 220 to consider alternative methods of powering loads 140-160 in an effort to reduce the cost of performance. Further, in some instances, energy management layer 220 determines whether reducing or removing an amount of energy generated by at least one of energy sources 110-130 benefits the economic performance of the data center.

Energy management layer 220 may execute a grid services control algorithm. Energy management layer 220 identifies one or more energy production services or load control services offered by utility grid providers. Energy management layer 220 determines whether the services benefit the functional performance or the economic performance of the data center.

Each of the control algorithms may be executed in defined interfaces. An interface refers to an application programming interface (API) that is displayed via a computing device within the data center. In some instances, particular APIs are dedicated to the execution of specific control algorithms. For example, the system topology tracking control algorithm, the energy source dispatch control algorithm, and the energy source control mode algorithm may be executed via one or more APIs for energy source controllers. Further, the load control and/or load shedding control algorithm may be executed via one or more APIs for data center cluster management services and load optimizers. In some instances, the economic dispatch control algorithm may be executed via one or more APIs with utility EMS interfaces and weather input interfaces. In some instances, the grid services control algorithm may be executed via one or more APIs for grid services. While three APIs are illustrated in FIG. 2, more or fewer than three APIs may be used to execute the control algorithms. Three APIs are described for illustrative purposes only, not limitation.

The APIs and the defined interfaces run within the virtualized computing environment described above and are hosted via a cloud network. This reduces the need for custom hardware to operate ECS 200. In some instances, ECS 200 is hosted via a network that also hosts operations and functions within the data center. For example, the data center may include one or more computing devices that are used for execution of the operations and functions within the data center. The network that hosts the one or more computing devices also hosts the interfaces associated with ECS 200.

Energy management layer 220 analyzes the current operation of the data center based on the execution of one or more control algorithms. In particular, energy management layer 220 may use the outcome(s) of the one or more control algorithms to identify one or more energy control modes (also referred to herein as control modes) for managing the performance of the data center. A control mode indicates an automatic reconfiguration of the energy distribution in the current operational status of the data center. A control mode may include an energy modification scheme that is achieved by executing a series of energy control actions (also referred to herein as control actions). Control actions indicate one or more steps to be executed to shift the data center energy configuration from its current operational status to the operational status outlined in the elected control mode. In some instances, control actions are executed to maintain a stable data center performance. In some instances, ECS 200 elects an energy control mode from the one or more energy control modes identified by energy management layer 220. However, in some instances, energy management layer 220 proposes a single energy control mode for managing performance of the data center.

ECS 200 uses electrical layer 210 to transmit instructions to sensors 111-171 indicating the control mode to be implemented within the data center. In some instances, the elected control mode adjusts the energy production of particular energy sources. In such instances, ECS 200 transmits the instructions to the sensors associated with the particular energy sources. In some instances, the elected control mode adjusts an amount of energy distributed to particular loads. Therefore, ECS 200 transmits the instructions to the sensors associated with the particular loads. The recipient sensors trigger a change in energy within the corresponding data center component. In particular, the recipient sensor transmits the instructions to the processors within the corresponding data center components that are configured to adjust an amount of energy that is produced by the data center component, an amount of energy that is requested by the data center component, or the like. The instructions that are transmitted to the processors within the corresponding data center component may identify specific voltage increases or reductions to be implemented within the data center component.

For example, the instructions can include instructions to perform voltage support. Voltage support is needed when there is an excessive reactive power requirement from within the datacenter facility or from the utility grid. This can cause a drop in voltages, voltage fluctuations, and/or voltage flickers that can cause the rectifiers supplying power to servers to drop off and come back on. Providing some reactive power onto the common bus provides voltage support and stabilizes the voltage. Voltage support may be executed by one or more of the control algorithms. Instructions to perform voltage support may include, for example, instructions to increase an amount of voltage that is produced by the energy source and transmitted to the DC power infrastructure or instructions to reduce the amount of voltage that is produced by the energy source and transmitted to the DC power infrastructure. The instructions to perform voltage support are transmitted, via the measurement sensor associated with the energy source, to the processors within the energy source that control voltage production within the energy source.

The instructions can also identify specific voltage readings that each load should pull from the DC power infrastructure. For example, the instructions can include instructions for a load to increase an amount of voltage that is pulled from the DC power infrastructure or to reduce the amount of voltage that is pulled from the DC power infrastructure. The instructions to adjust the amount of energy that is pulled are transmitted, via the measurement sensor associated with the load, to the processors within the load that control the amount of voltage that is pulled from the DC power infrastructure.

Figure 3A:
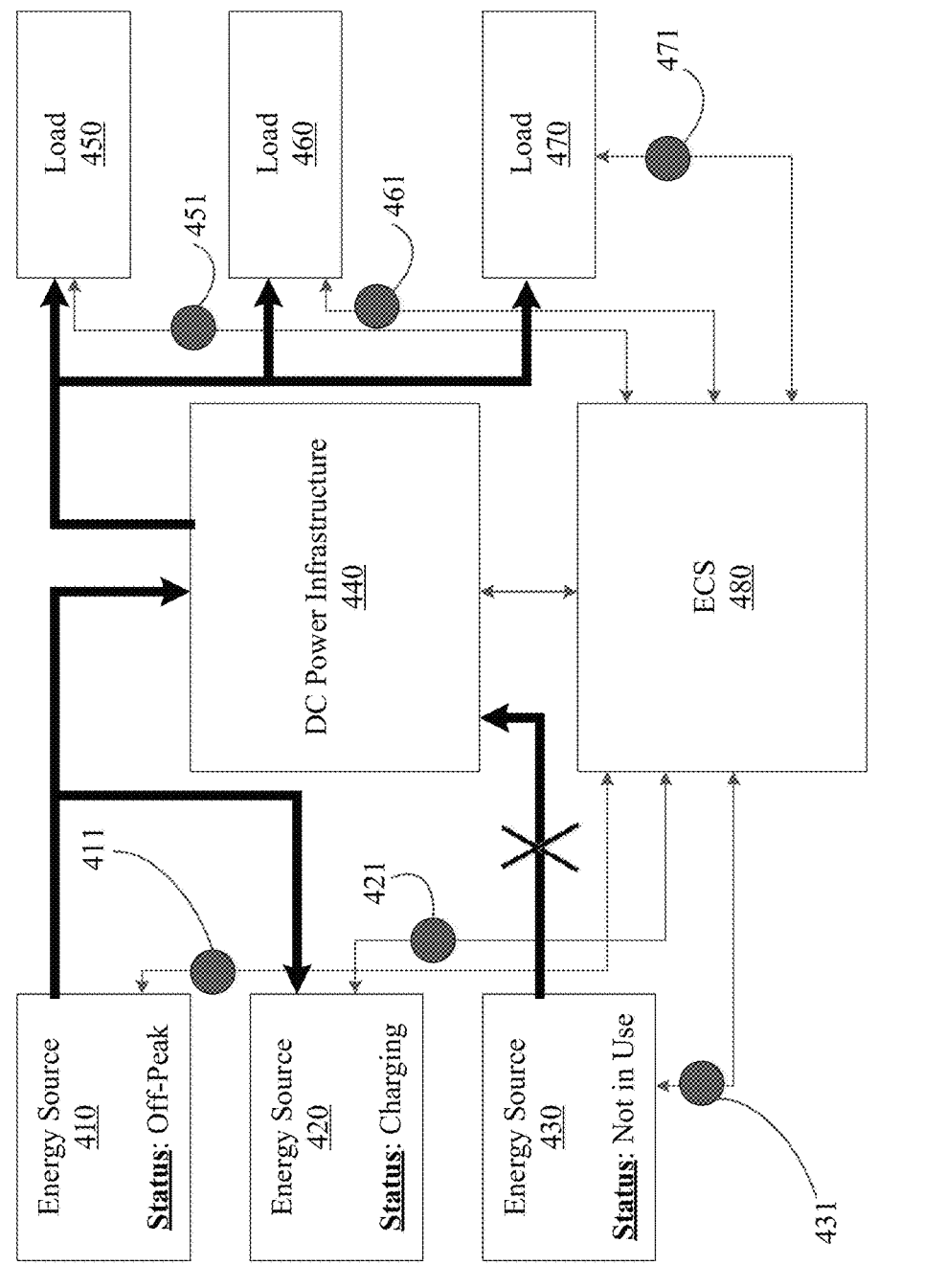
FIGS. 3A-3C illustrate an example implementation of controlling energy usage within data centers, in accordance with aspects of the disclosure.
Figure 3B:
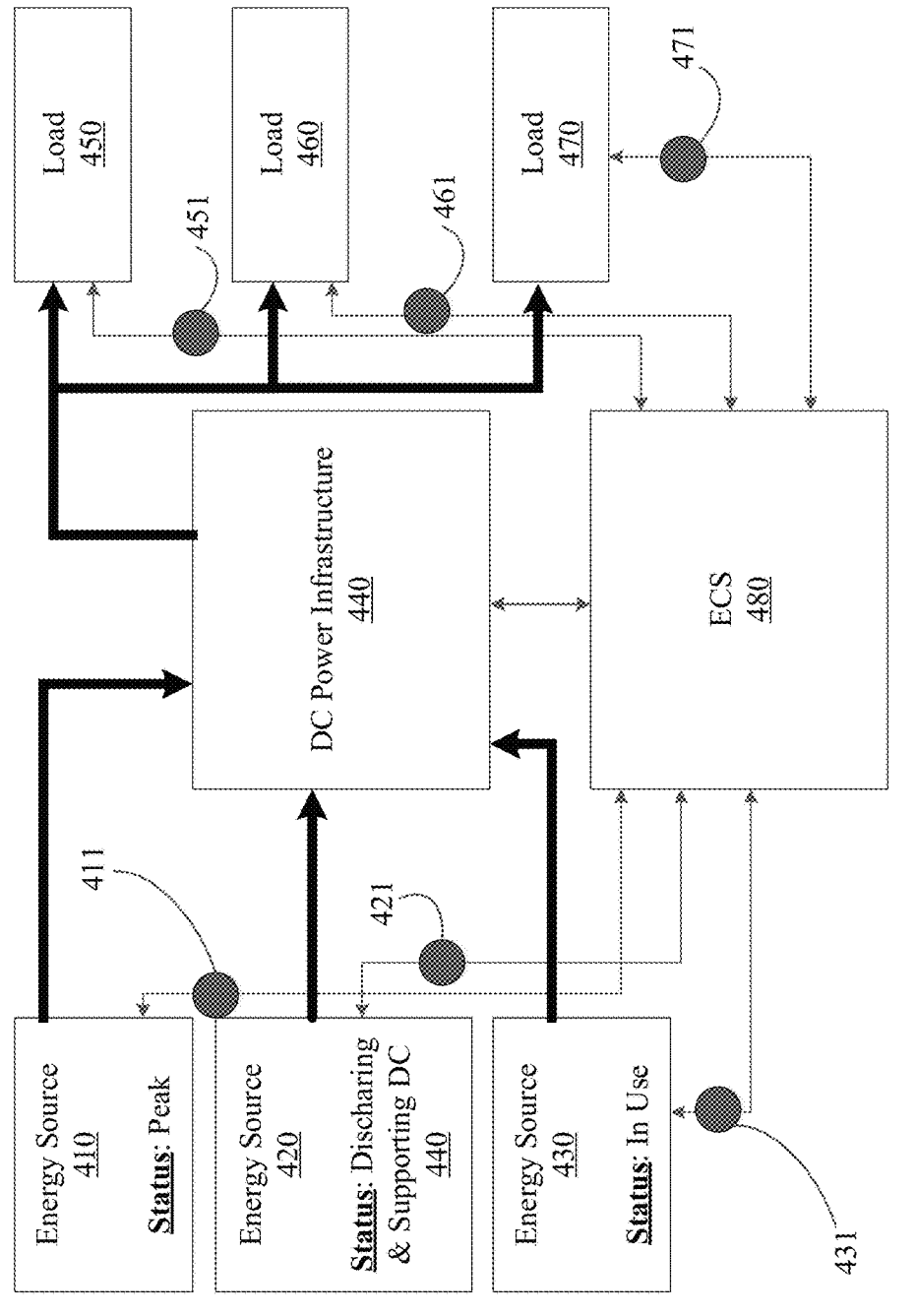
Figure 3C:
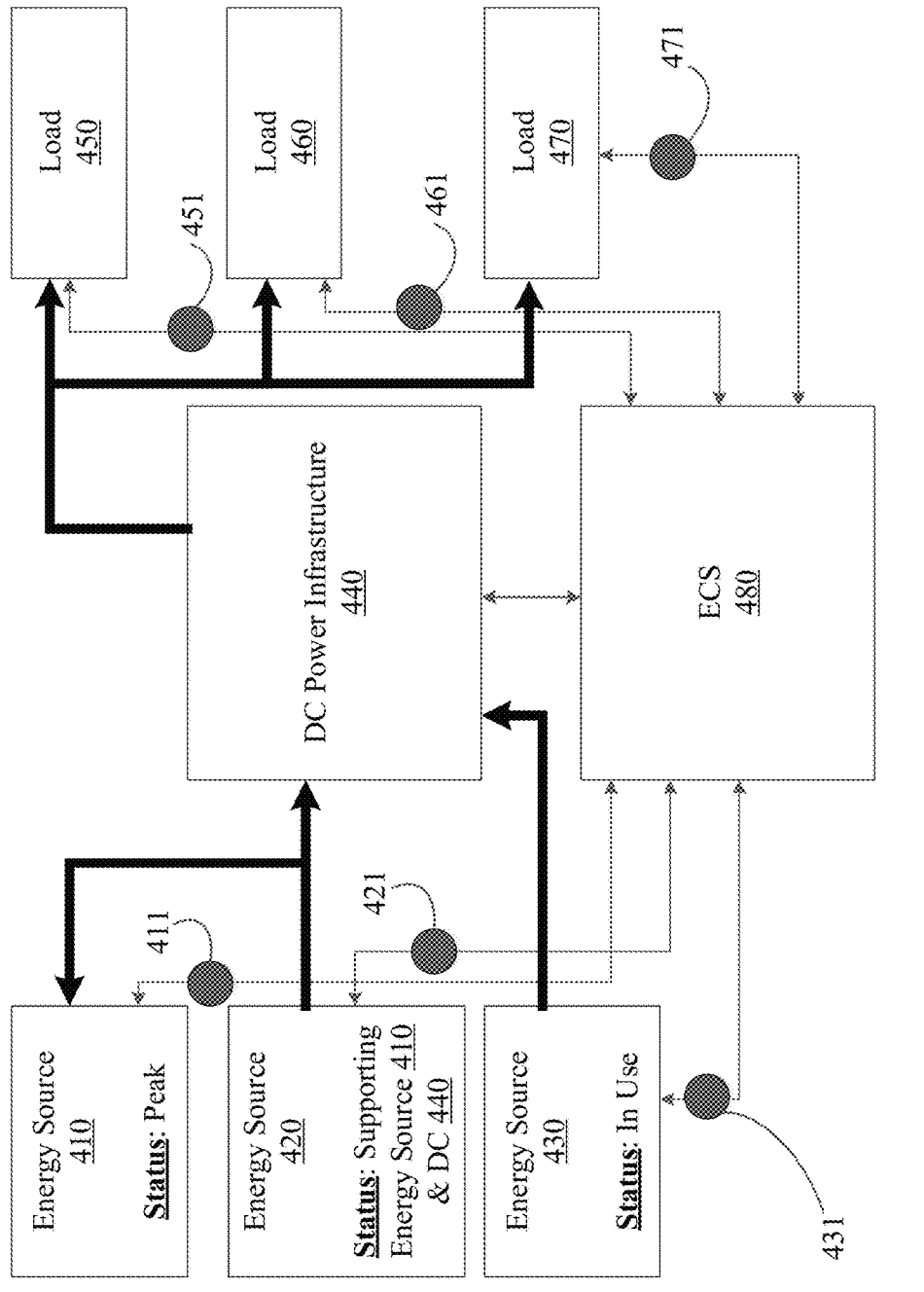

FIGS. 3A-3C illustrates an example implementation of controlling energy usage within a data center. In particular, FIGS. 3A-3C illustrate changing the energy source from which a load receives energy based on determining that the overall efficiency and performance of the data center can be improved by powering the load using a different energy source. Energy environment 300 illustrates an example data center that includes energy sources 410-430, DC power infrastructure 440, loads 450-470, and ECS 480. The components of energy environment 300 have the same functionality as the energy environment components described in FIGS. 1-2 above.

As illustrated in FIG. 3A, energy source 410 corresponds to a utility power grid, energy source 420 corresponds to a battery, and energy source 430 corresponds to any other kind of energy source. Each of energy sources 410-430 has corresponding asset state information that indicates a state of a respective energy source. The asset state information corresponding to energy source 410 indicates that energy source 410 produces energy during off-peak hours. The asset state information corresponding to energy source 420 indicates that energy source 420 is charging. The asset state information corresponding to energy source 430 indicates that energy source 430 is not in use. The power generated by energy sources 410-430 is fed into DC power infrastructure 440 and is used to power loads 450-470. The flow of energy in energy environment 300, depicted by the bold lines, indicates that energy source 420 is in a charging state using power from energy source 410 that is produced during off-peak hours.

The energy that is generated by energy sources 410-430 is monitored by corresponding sensors 411-431. In addition to monitoring the amount of energy produced by each energy source, sensors 411-431 also transmit a state of each energy source to ECS 480. Similarly, the amount of energy that is used to power loads 450-470 is monitored by corresponding sensors 451-471. In addition to monitoring the amount of energy that is used to power the loads, sensors 451-471 also transmit the state of the loads to ECS 480.

ECS 480 compiles the received energy information and the received state information to generate the load profile of the data center. ECS 480 analyzes the load profile using at least one control algorithm, described above. The outcome of the load profile analysis may trigger at least one control mode that ECS 480 may implement to more efficiently manage the production and usage of energy within energy environment 300. For example, the execution of the control algorithms may indicate that the performance of energy environment 300 does not require energy distribution modification since the amount of energy produced by energy source 410 during off-peak hours is used to power loads 450-470 and energy source 420 is charged.

However, continuous analysis of the load profile by ECS 480 may identify at least one control mode that can be implemented to enhance the performance of energy environment 300. FIG. 3B illustrates a snapshot of computing environment 300 taken sometime after the snapshot of FIG. 3A.

As illustrated in FIG. 3B, the status of energy source 410 changed from off-peak to peak and the status of energy source 420 changed from charging to discharging and providing energy to DC power infrastructure 440. The changes in status may be reported to ECS 480 via the corresponding sensors. The change in status from off-peak to peak may trigger ECS 480 to further consider the economic consequences of generating some amount of power from energy source 420 during peak hours and/or pulling energy from the grid 410 during peak hours. ECS 480 may identify a control mode that suggests an alternative power generation scheme during peak hours. For example, a control mode may indicate that when power from a grid is generated during peak hours or pulled from the grid during peak hours, then available alternative energy sources within the data center should be used to power the loads. The control mode may specify the mix of the grid power 410 and other available alternative energy sources 420 and 430 s within the data center to power the loads.

ECS 480 may elect the described control mode to modify the performance of the data center. As such, ECS 480 may transmit instructions to energy sources 410, 420 and 430 as well as loads 450, 460 and 470. ECS 480 can transmit the instructions using the corresponding sensors. The instructions transmitted to energy source 410 may include instructions to reduce energy consumption during peak hours. The instructions transmitted to energy source 420 may include instructions to change the state from charging to discharging to power the loads during the peak hours. The instructions transmitted to energy source 430 may include processor level instructions to start energy production to power loads 450-470. The instructions transmitted to loads 450-470 may include processor level instructions to reduce receipt of energy from energy source 410 and to accept energy from energy source 420 and energy source 430.

As illustrated in FIG. 3B, energy source 410 supplies reduced energy to DC power infrastructure and energy sources 420 and 430 supply the rest of the energy required for loads 450, 460 and 470.

FIG. 3C illustrates a modified energy generation and energy usage configuration. FIG. 3C illustrates a snapshot of energy environment 300 taken sometime after the snapshot of FIGS. 3A and 3B. As illustrated in FIG. 3C, energy source 420 is supplying power to energy source 410 to provide grid support. Energy source 430 is supplying power via DC power infrastructure 440 to power loads 450-470 in a reduced load configuration by modifying the load profile through the APIs like cluster management services and load optimizers.

While FIGS. 3A-3C illustrates a single example use case, the ECS may be used in different energy use cases. For example, in another use case, the ECS regulates battery powered energy sources for maximum discharge into the utility energy source. For example, the ECS feeds power from the data center back into the utility grid to provide grid stability during the peak period. At the same time, the ECS also works with the fully virtualized IT infrastructure software controls to shift or pause non-critical loads.

Another use case provides for modifications to the energy distribution within the data center when utilities become aware of impending bad weather conditions. In such instances, the utilities may request that data centers reduce power usage. Such power usage reduction signals can be routed through the ECS to find an internal power distribution strategy that keeps the most critical loads on and turns off non-critical loads for defined durations.

Another use case allows the ECS to maintain the dynamic stability of the data center during disturbances. The ECS can create an overarching outer loop control for all energy sources to keep them in a stable operation mode during power system disturbances. Due to the non-linear nature of the disturbances, each power generation source responds differently depending on their local settings. In such instances, the ECS fine tunes one or more controllers that are used to stabilize the energy sources.

FIG. 4 illustrates a flow diagram for an example method for controlling energy usage within data centers. The operations described herein are presented in the current order by way of example, and the order is not meant to be limiting. Moreover, operations may be omitted from or added to the example method.

At block 401, ECS 200 may receive, from a plurality of measurement sensors and in a virtual machine deployed in a virtual computing environment, energy information associated with a plurality of energy sources and a plurality of loads within the data center. Each of the energy sources 110-130 and loads 140-170 have a respective sensor, such as sensors 111-171. Each of the sensors 111-171 may be a measurement sensor that is configured to read energy information and asset state information for the respective data center component.

Sensors 111-131 may detect energy transmissions from energy sources 110-130 to DC power infrastructure 180. Based on detecting energy transmissions, sensors 111-131 measures an amount of energy that each energy source routes to DC power infrastructure 180. Sensors 141-171 may detect energy transmissions from DC power infrastructure 180 to loads 140-170. Based on detecting energy transmissions, sensors 140-170 measures an amount of energy that is routed to each of loads 140-170. Sensors 111-171 route energy information to energy control system (ECS) 200.

At block 402, ECS 200 may generate, based on the received energy information and asset state information, a load profile comprising the energy information, where the load profile indicates energy generation information and energy usage information. In particular, the load profile indicates the energy generation information gathered from sensors 111-131. Further, the load profile indicates the energy usage information gathered from sensors 141-171. ECS 200 analyzes the load profile to determine whether to adjust the energy generation and usage configuration indicated on the load profile.

At block 403, ECS 200 may determine, using a control algorithm, whether to adjust an energy distribution configuration based on the load profile. Each control algorithm analyzes an amount of energy produced by energy sources 110-130 and an amount of energy used during the operation of loads 140-170. The amount of energy produced by energy sources 110-130 may be adjusted relative to the amount of energy used during the operation of loads 140-170. Similarly, the amount of energy used during the operation of loads 140-170 may be adjusted relative to the amount of energy produced by energy sources 110-130.

ECS 200 executes one or more control algorithms, including but not limited to a system topology tracking control algorithm, an energy source dispatch control algorithm, an energy source control mode control algorithm, a load control and/or load shedding control algorithm, an economic dispatch control algorithm, and/or a grid services control algorithm. Each of the described control algorithms may be executed within defined interfaces. For example, the system topology tracking control algorithm, the energy source dispatch control algorithm, and the energy source control mode algorithm may be executed via one or more APIs for energy source controllers. Further the load control and/or load shedding control algorithm may be executed via one or more APIs for data center cluster management services and load optimizers. In some instances, the economic dispatch control algorithm may be executed via one or more APIs with utility EMS interfaces and weather input interfaces. In some instances, the grid services control algorithm may be executed via one or more APIs for grid services.

ECS 200 uses the outcome(s) of the one or more control algorithms to identify one or more energy control modes for increasing the overall performance of the data center while decreasing the cost of performance of the data center. An energy control mode may include an energy modification scheme that is achieved by executing a series of energy control actions.

At block 404, ECS 200 may transmit, via a measurement sensor associated with a load, a control mode to the load. In some instances, ECS 200 also transmits, via a measurement sensor associated with an energy source, the control mode to the energy source. ECS 200 uses electrical layer 210 to transmit instructions to sensors 111-171 indicating the control mode to be implemented within the data center. In some instances, the control mode adjusts the energy production of particular energy sources. Therefore, ECS 200 transmits the instructions to the sensors associated with the particular energy sources. The recipient sensor may access the corresponding data center component at a processor level to implement the elected energy control mode. Further, in some instances, the control mode adjusts an amount of energy used by a particular load, such as an amount of energy that the particular loads pull from a DC power infrastructure within the data center. ECS 200 transmits instructions to the sensors associated with particular loads. The recipient sensors access the corresponding data center component at a processor level to implement the elected control mode.

Figure 5:
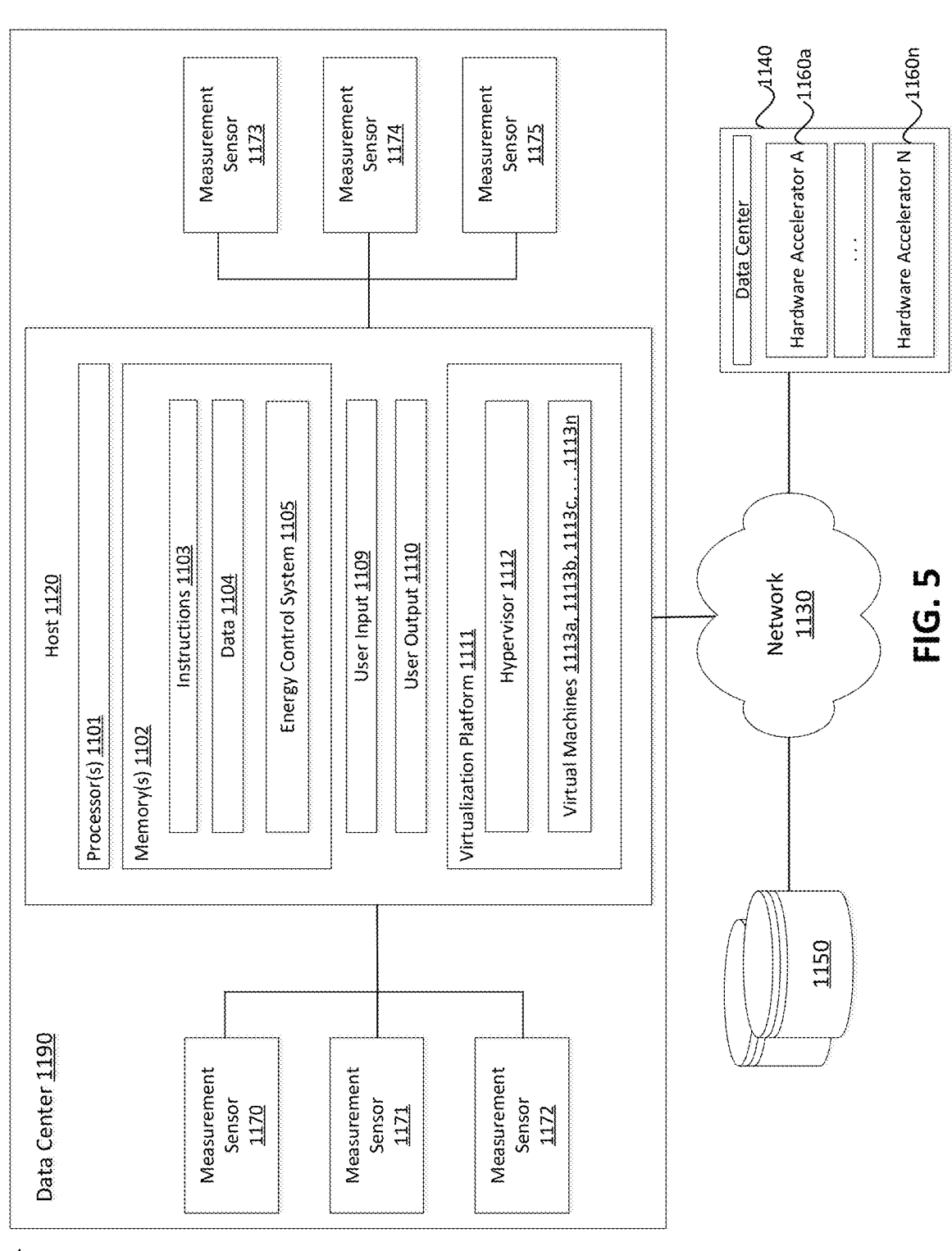
FIG. 5 illustrates a block diagram of an example energy environment for controlling energy usage within data centers, in accordance with aspects of the disclosure.

FIG. 5 illustrates a block diagram of an example energy environment for controlling energy usage within data centers. Controlling energy usage within data centers may require a computing device within a data center. The computing device is configured to host the energy control system, for example, via a virtualized computing environment. The computing device may communicate directly with one or more measurement sensors, where each measurement sensor corresponds to a data center component (also referred to herein as a data center asset). Further, the computing device may communicate with data center storage and/or data center hardware accelerators via a data center network.

For example, the data center network may include a host computing device located within a data center, such as host 1120 located in data center 1190. Data center 1190 may store a plurality of data center components, such as the host computing device and one or more measurement sensors coupled to one or more energy sources and loads. Host 1120 may be communicatively coupled to one or more storage devices over a network. The storage devices may be a combination of volatile and non-volatile memory and may be at the same or different physical locations than the computing devices. For example, the storage devices may include any type of non-transitory computer readable medium capable of storing information, such as a hard-drive, solid state drive, tape drive, optical storage, memory card, ROM, RAM, DVD, CD-ROM, write-capable, and read-only memories.

Host 1120 may include one or more processors and memory, such as processor(s) 1101 and memory(s) 1102 (referred to herein as memory 1102). Memory(s) 1102 may include instructions 1103, data 1104, and measurement sensor 1105. Host 1120 may also include a user input and a user output, such as user input 1109 and user output 1110. Further, host 1120 may include virtualization capabilities provided via virtualization platform 1111. In particular, virtualization platform 1111 may include hypervisor 1112, which manages one or more virtual machines that run on host 1120, such as virtual machines 1113a, 1113b, 1113c, . . . 1113n.

Memory 1102 may store information accessible by the processors, including instructions that may be executed by the processors. Memory 1102 may also include data that may be read, retrieved, manipulated, or stored by the processors. Memory 1102 may be a type of non-transitory computer readable medium capable of storing information accessible by the processors, such as volatile and non-volatile memory. Processors 1101 may include one or more central processing units (CPUs), graphic processing units (GPUs), field-programmable gate arrays (FPGAs), and/or application-specific integrated circuits (ASICs), such as tensor processing units (TPUs).

Instructions 1103 may include one or more instructions that, when executed by the processors, cause the one or more processors to perform actions defined by the instructions. Instructions 1103 may be stored in object code format for direct processing by the processors, or in other formats including interpretable scripts or collections of independent source code modules that are interpreted on demand or compiled in advance. Instructions 1103 may include instructions for controlling energy usage within data centers.

Data 1104 may be read, retrieved, stored, or modified by the processors in accordance with the instructions. Data 1104 may be stored in computer registers, in a relational or non-relational database as a table having a plurality of different fields and records, or as JSON, YAML, proto, or XML documents. Data 1104 may also be formatted in a computer-readable format such as, but not limited to, binary values, ASCII, or Unicode. Moreover, data 1104 may include information sufficient to identify relevant information, such as numbers, descriptive text, proprietary codes, pointers, references to data stored in other memories, including other network locations, or information that is used by a function to calculate relevant data.

User input 1109 may include any appropriate mechanism or technique for receiving input, such as keyboard, mouse, mechanical actuators, soft actuators, touchscreens, microphones, and sensors. In some implementations, user input 1109 may be used to receive notifications indicating successful modification of energy usage within data centers.

User output 1110 may be used to display the one or more defined interfaces and APIs within which the control algorithms may be executed.

Virtualization platform 1111 may be used to run energy control system 1105 in a virtual computing environment. To do so, host 1120 may use hypervisor 1112 to instantiate one or more virtual computing instances. In some examples, a virtual computing instance uses one or more virtual computing devices, such as virtual machines 1113a, 1113b, 1113c, . . . 1113n. The energy analysis performed by energy control system 1105 may be executed within virtualization platform 1111. To do so, virtualization platform 1111 may interface with one or more measurement sensors that are communicatively coupled to host 1120.

Each of the measurement sensors 1170-1175 may be coupled to a different data center component, such as an energy source or a load. Measurement sensors that are associated with energy sources may measure an amount of energy that a specific energy source produces. Measurement sensors that are associated with loads may measure an amount of energy that is used to power a specific load. Measurement sensors may transmit the readings obtained therein to energy control system 1105 within host 1120. Further, the measurement sensors may transmit asset state information that corresponds to each data center component. The asset state information may indicate a state of each component, whether each component is in use, or the like.

Energy control system 1105 may analyze the received energy information and the received asset state information using one or more control algorithms. Based on the analysis of the one or more control algorithms, energy control system 1105 may elect a control mode that outlines one or more energy production or energy usage modifications to the current operational status of the data center.

Energy control system 1105 may transmit instructions to measurement sensors 1170-1175, where the instructions include control actions to be executed to satisfy the elected control mode. In particular, the control actions modify the current operational status of the data center to the operational status indicated in the control mode.

In some instances, the described analysis performed by energy control system 1105 may be performed within a virtualized computing environment using virtualization platform 1111. In particular, hypervisor 1112 may instantiate an instance of a virtual computing environment and may launch at least one virtual machine within the instance of the virtual computing environment. Energy control system 1105 may use the instance of the virtual computing environment to execute the described analysis. In doing so, host 1120 may receive information from measurement sensors 1170-1175 and the received information may be analyzed within virtualization platform 1111.

Although FIG. 5 illustrates the processors and the memories as being within the computing device, components described herein can include multiple processors and memories that can operate in different physical locations and not within the same computing device. For example, some of the instructions and the data can be stored on a removable SD card and others within a read-only computer chip. Some or all of the instructions and data can be stored in a location physically remote from, yet still accessible by, the processors. Similarly, the processors can include a collection of processors that can perform concurrent and/or sequential operation. The computing device can each include one or more internal clocks providing timing information, which can be used for time measurement for operations and programs run by the computing device.

Host 1120 may be connected over network 1130 to a data center housing any number of hardware accelerators, such as data center 1140 housing hardware accelerators 1160*a*-1160*n*. Data center 1140 can be one of multiple data centers or other facilities in which various types of computing devices, such as hardware accelerators, are located. Computing resources housed in the data center can be specified for controlling energy usage in data centers, as described herein.

The control algorithms, outcomes of the control algorithms, energy load profiles, historic energy load profiles, energy control modes, and energy control actions may be stored in database 1150.

Host 1120, data center 1140, storage 1150, and measurement sensors 1170-1175 may be capable of direct and indirect communication over network 1130.

Network 1130 itself may include various configurations and protocols including the Internet, World Wide Web, intranets, virtual private networks, wide area networks, local networks, and private networks using communication protocols proprietary to one or more companies. Network 1130 may support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. Network 1130 may, in addition or alternatively, also support wired connections between the devices and the data center, including over various types of Ethernet connection.

It is understood that the aspects of the disclosure may be implemented according to a variety of different configurations and quantities of computing devices, including in paradigms for sequential or parallel processing, or over a distributed network of multiple devices.

Aspects of the disclosed technology may take the form of a method, process, apparatus, system, non-transitory computer readable storage medium, or power distribution network. Those examples may include one or more of the following features (e.g., F1 through F23):

F1. A system comprising:
a first plurality of measurement sensors coupled to a plurality of energy sources;
a second plurality of measurement sensors coupled to a plurality of loads;
a power infrastructure configured to receive energy from the plurality of energy sources and distribute energy to the plurality of loads;
an energy control system deployed in one or more instances running in a virtual computing environment of a data center, the energy control system coupled to the first plurality of measurement sensors and the second plurality of measurement sensors and configured to:
derive, from data received from the first plurality of measurement sensors and the second plurality of measurement sensors, a load profile comprising energy information associated with the plurality of energy sources and the plurality of loads within the data center;
determine, using a control algorithm, whether to adjust an energy distribution configuration based on the load profile; and transmit, via a measurement sensor of the second plurality of measurement sensors that is associated with a load, a control mode to the load.

F2. The system of F1, wherein the energy information identifies particular energy sources that are configured to distribute energy to particular loads via the power infrastructure.

F3. The system of any one of F1 to F2, wherein the control mode comprises modifications to the energy distribution configuration.

F4. The system of any one of F1 to F3, wherein modifying the energy distribution configuration causes the energy control system to:
select energy sources of the plurality of energy sources to continue supplying energy to the power infrastructure; and
select energy sources of the plurality of energy sources to stop supplying energy to the power infrastructure.

F5. The system of any one of F1 to F4, wherein the load receives energy from the energy sources of the plurality of energy sources that continue to supply energy to the power infrastructure.

F6. The system of any one of F1 to F5, wherein adjusting the energy distribution configuration causes the energy control system to:
instruct the load to reduce an amount of voltage that is pulled from the power infrastructure; or
instruct the load to increase the amount of voltage that is pulled from the power infrastructure.

F7. The system of any one of F1 to F6, wherein the one or more instances running in the virtual computing environment are hosted by one or more virtual machines controlled by a hypervisor.

F8. The system of any one of F1 to F7,
wherein the first plurality of measurement sensors are integrated within the plurality of energy sources; and
wherein the second plurality of measurement sensors are integrated within the plurality of loads and electrical equipment within the data center.

F9. The system of any one of F1 to F8, wherein determining, using the control algorithm, whether to adjust the energy distribution configuration further causes the energy control system to:
track a topology of the data center; and
track a topology of the plurality of energy sources within the data center.

F10. The system of any one of F1 to F9, wherein determining, using the control algorithm, whether to adjust the energy distribution configuration further causes the energy control system to dispatch the energy source based on load needs of the data center.

F11. The system of any one of F1 to F10, wherein determining, using the control algorithm, whether to adjust the energy distribution configuration further causes the energy control system to:
perform fast load shedding based on the dispatch of the energy source;
balance remaining energy sources of the plurality of energy sources; and
balance an amount of energy that is distributed to remaining loads of the plurality of loads.

F12. The system of any one of F1 to F11, wherein determining, using the control algorithm, whether to adjust the energy distribution configuration further causes the energy control system to:
monitor an amount of energy generated by the energy source during a current operation of the data center;

monitor changes in the amount of energy generated based on comparing the amount of energy generated during the current operation of the data center to an amount of energy generated in historic operations of the data center; and modify an amount of energy generated by the energy source based on the monitored changes.

F13. The system of any one of F1 to F12, wherein control mode comprises control actions for maintaining stable performance of the data center.

F14. A method for managing energy usage in a data center, the method comprising:

receiving, from a plurality of measurement sensors and by an energy control system running in a virtual machine deployed in a virtual computing environment, energy information associated with a plurality of energy sources and a plurality of loads within the data center;

generating, based on the received energy information, a load profile comprising the energy information, the load profile indicating energy generation information and energy usage information;

determining, by the energy control system and using a control algorithm, whether to adjust an energy distribution configuration based on the load profile; and transmitting, by the energy control system and via a measurement sensor associated with a load, a control mode to the load.

F15. The method of F14, wherein the virtual computing environment comprises one or more virtual machines instances controlled by a hypervisor.

F16. The method of any one of F14 to F15, wherein adjusting the energy distribution configuration comprises:

instructing, by the energy control system and via the measurement sensor associated with the load, the load to reduce an amount of voltage that is pulled from a power infrastructure; or instructing, by the energy control system and via the measurement sensor associated with the load, the load to increase the amount of voltage that is pulled from the power infrastructure.

F17. The method of any one of F14 to F16, wherein control mode comprises energy control actions for adjusting the energy distribution configuration to maintain stable performance of the data center.

F18. The method of any one of F14 to F17, wherein the plurality of measurement sensors comprises:

a first plurality of measurement sensors integrated within the plurality of energy sources; and a second plurality of measurement sensors integrated within the plurality of loads.

F19. The method of any one of F14 to F18, wherein the energy information identifies particular energy sources that are configured to distribute energy to particular loads via a power infrastructure within the data center.

F20. The method of any one of F14 to F19, wherein control mode comprises modifications to the energy distribution configuration.

F21. The method of any one of F14 to F20, further comprising modifying, by the energy control system, the energy distribution configuration, the modifying comprising:

selecting, by the energy control system, energy sources of the plurality of energy sources to continue supplying energy to a power infrastructure; and selecting energy sources of the plurality of energy sources to stop supplying energy to a power infrastructure.

F22. The method of any one of F14 to F21, further comprising transmitting, by the energy control system and via a measurement sensor associated with an energy source, the control mode to the energy source.

F23. A non-transitory computer readable storage medium storing instructions that, when executed by one or more processors for managing energy usage in a data center using an energy control system deployed in one or more instances running in a virtual computing environment of the data center, cause the one or more processors to:

derive, from data received from a first plurality of measurement sensors and a second plurality of measurement sensors, a load profile comprising energy information associated with a plurality of energy sources and a plurality of loads within the data center;

determine, using a control algorithm, whether to adjust an energy distribution configuration based on the load profile; and transmit, via a measurement sensor of the second plurality of measurement sensors that is associated with a load, a control mode to the load.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers or special purpose logic circuitry, such as a system on chip (SoC) executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back-end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the implementations should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system comprising:

a first plurality of measurement sensors coupled to a plurality of energy sources;

a second plurality of measurement sensors coupled to a plurality of loads;

a power infrastructure configured to receive energy from the plurality of energy sources and distribute energy to the plurality of loads;

an energy control system deployed in one or more instances running in a virtual computing environment of a data center, the energy control system coupled to the first plurality of measurement sensors and the second plurality of measurement sensors and configured to:

derive, from data received from the first plurality of measurement sensors and the second plurality of measurement sensors, a load profile comprising energy information associated with the plurality of energy sources and the plurality of loads within the data center;

determine, using a control algorithm, whether to adjust an energy distribution configuration based on the load profile; and transmit, via a measurement sensor of the second plurality of measurement sensors that is associated with a load, a control mode to the load; and transmit, via a measurement sensor of the second plurality of measurement sensors that is associated with a load, a control mode to the load; and wherein to determine, using the control algorithm, whether to adjust the energy distribution configuration further causes the energy control system to:

monitor an amount of energy generated by the energy source during a current operation of the data center;

monitor changes in the amount of energy generated based on comparing the amount of energy generated during the current operation of the data center to an amount of energy generated in historic operations of the data center; and modify an amount of energy generated by the energy source based on the monitored changes.

2. The system of claim 1, wherein the energy information identifies particular energy sources that are configured to distribute energy to particular loads via the power infrastructure.

3. The system of claim 1, wherein the control mode comprises modifications to the energy distribution configuration.

4. The system of claim 3, wherein modifying the energy distribution configuration causes the energy control system to:

select energy sources of the plurality of energy sources to continue supplying energy to the power infrastructure; and select energy sources of the plurality of energy sources to stop supplying energy to the power infrastructure.

5. The system of claim 1, wherein the one or more instances running in the virtual computing environment are hosted by one or more virtual machines controlled by a hypervisor.

6. The system of claim 1, wherein the first plurality of measurement sensors are integrated within the plurality of energy sources; and wherein the second plurality of measurement sensors are integrated within the plurality of loads and electrical equipment within the data center.

7. The system of claim 1, wherein determining, using the control algorithm, whether to adjust the energy distribution configuration further causes the energy control system to:

track a topology of the data center; and track a topology of the plurality of energy sources within the data center.

8. The system of claim 1, wherein determining, using the control algorithm, whether to adjust the energy distribution configuration further causes the energy control system to dispatch the energy source based on load needs of the data center.

9. The system of claim 8, wherein determining, using the control algorithm, whether to adjust the energy distribution configuration further causes the energy control system to:

perform fast load shedding based on the dispatch of the energy source;

balance remaining energy sources of the plurality of energy sources; and balance an amount of energy that is distributed to remaining loads of the plurality of loads.

10. The system of claim 1, wherein the control mode comprises control actions for maintaining stable performance of the data center.

11. A method for managing energy usage in a data center, the method comprising:

receiving, from a plurality of measurement sensors and by an energy control system running in a virtual machine deployed in a virtual computing environment, energy information associated with a plurality of energy sources and a plurality of loads within the data center;

generating, based on the received energy information, a load profile comprising the energy information, the load profile indicating energy generation information and energy usage information;

determining, by the energy control system and using a control algorithm, whether to adjust an energy distribution configuration based on the load profile; and transmitting, by the energy control system and via a measurement sensor associated with a load, a control mode to the load; and wherein determining, by the energy control system and using a control algorithm, whether to adjust the energy distribution configuration comprises:

monitoring an amount of energy generated by the energy source during a current operation of the data center;

monitoring changes in the amount of energy generated based on comparing the amount of energy generated during the current operation of the data center to an amount of energy generated in historic operations of the data center; and modifying an amount of energy generated by the energy source based on the monitored changes.

12. The method of claim 11, wherein the virtual computing environment comprises one or more virtual machines instances controlled by a hypervisor.

13. The method of claim 11, wherein the control mode comprises energy control actions for adjusting the energy distribution configuration to maintain stable performance of the data center.

14. The method of claim 11, wherein the plurality of measurement sensors comprises:

a first plurality of measurement sensors integrated within the plurality of energy sources; and a second plurality of measurement sensors integrated within the plurality of loads.

15. The method of claim 11, wherein the energy information identifies particular energy sources that are configured to distribute energy to particular loads via a power infrastructure within the data center.

16. The method of claim 11, wherein the control mode comprises modifications to the energy distribution configuration.

17. The method of claim 11, further comprising modifying, by the energy control system, the energy distribution configuration, the modifying comprising:

selecting, by the energy control system, energy sources of the plurality of energy sources to continue supplying energy to a power infrastructure; and selecting energy sources of the plurality of energy sources to stop supplying energy to a power infrastructure.

18. The method of claim 11, further comprising transmitting, by the energy control system and via a measurement sensor associated with an energy source, the control mode to the energy source.

19. A non-transitory computer readable storage medium storing instructions that, when executed by one or more processors for managing energy usage in a data center using an energy control system deployed in one or more instances running in a virtual computing environment of the data center, cause the one or more processors to:

derive, from data received from a first plurality of measurement sensors and a second plurality of measurement sensors, a load profile comprising energy information associated with a plurality of energy sources and a plurality of loads within the data center;

determine, using a control algorithm, whether to adjust an energy distribution configuration based on the load profile; and transmit, via a measurement sensor of the second plurality of measurement sensors that is associated with a load, a control mode to the load; and wherein to determine, using the control algorithm, whether to adjust the energy distribution configuration further causes the one or more processors to:

monitor an amount of energy generated by the energy source during a current operation of the data center;

monitor changes in the amount of energy generated based on comparing the amount of energy generated during the current operation of the data center to an amount of energy generated in historic operations of the data center; and modify an amount of energy generated by the energy source based on the monitored changes.

* * * * *